United States Patent [19]

Smith

[11] Patent Number: 4,737,192

[45] Date of Patent: Apr. 12, 1988

[54] REFRACTORY BINDER, METHOD FOR MAKING SAME, AND PRODUCT PRODUCED THEREBY

[75] Inventor: William H. Smith, McMurray, Pa.

[73] Assignee: Manville Service Corporation, Denver, Colo.

[21] Appl. No.: 660,190

[22] Filed: Oct. 12, 1984

Related U.S. Application Data

[63] Continuation-in-part of Ser. No. 542,272, Oct. 17, 1983, abandoned.

[51] Int. Cl.$^4$ .............................................. C04B 12/02
[52] U.S. Cl. .................................. 106/85; 501/95; 501/127; 501/142
[58] Field of Search ............... 501/142, 127, 95; 106/85

[56] References Cited

U.S. PATENT DOCUMENTS

| | | | |
|---|---|---|---|
| 2,128,404 | 8/1938 | Dunbeck | 106/38.9 |
| 2,189,897 | 11/1939 | Dunbeck | 106/38.9 |
| 2,230,939 | 2/1941 | Dunbeck | 106/38.9 |
| 2,237,592 | 4/1941 | Dunbeck | 106/38.9 |
| 2,237,593 | 4/1941 | Dunbeck | 106/38.9 |
| 2,256,943 | 9/1941 | Dunbeck | 106/38.9 |
| 3,658,563 | 4/1972 | Washio et al. | 106/85 |
| 3,789,096 | 1/1974 | Church et al. | 264/60 |
| 3,873,344 | 3/1975 | Church et al. | 117/62 |
| 3,888,687 | 6/1975 | Manigault | 501/127 |
| 3,925,575 | 12/1975 | Church et al. | 427/226 |
| 3,944,683 | 3/1976 | Church et al. | 427/34 |
| 3,948,670 | 4/1976 | Manigault | 501/127 |
| 3,956,531 | 5/1976 | Church et al. | 427/226 |
| 3,977,888 | 8/1976 | Sano et al. | 106/74 |
| 3,985,916 | 10/1976 | Church et al. | 427/46 |
| 4,007,020 | 2/1977 | Church et al. | 51/295 |
| 4,077,808 | 3/1978 | Church et al. | 51/295 |
| 4,160,673 | 7/1979 | Fujita et al. | 501/142 |
| 4,440,865 | 4/1984 | Salazar | 501/95 |
| 4,547,403 | 10/1985 | Smith | 501/95 |

FOREIGN PATENT DOCUMENTS

| | | | |
|---|---|---|---|
| 49-87723 | 8/1974 | Japan . | |
| 51-40846 | 11/1976 | Japan . | |
| 56-59665 | 5/1981 | Japan | 501/95 |
| 2093010 | 8/1982 | United Kingdom | 501/95 |
| 2093015 | 8/1982 | United Kingdom . | |

OTHER PUBLICATIONS

Phosphate Bonding Then and Now, by John E. Cassidy–Ceramic Bulletin, Jul. 1977, at p. 640.

Hot Strength of Phosphate-Bonding Refractory Plastics, by Herbert E. Fisher, vol. 56, No. 7–Ceramic Bulletin, Jul. 1977, at p. 637.

Fundamental Study of Phosphate Bonding in Refractories: 1, Literature Review, by William David Kingery in The Journal of the American Ceramic Society, vol. 33, No. 8, Aug. 1, 1950 at p. 239.

*Primary Examiner*—Steven Capella
*Attorney, Agent, or Firm*—John D. Lister; Cornelius P. Quinn; Timothy R. Schulte

[57] ABSTRACT

A refractory binder including a tackifying agent. The tackifying agent is a montrorillorite clay. The binder is a chromium alumina phosphate mixture with a fluxing agent. The binder may also be a colloidal suspension of alumina, silica or zirconia with montmorillonite clay. The binder is used with refractory fiber to produce a monolithic layer.

15 Claims, No Drawings

REFRACTORY BINDER, METHOD FOR MAKING SAME, AND PRODUCT PRODUCED THEREBY

RELATED APPLICATIONS

This application is a continuation in part of U.S. patent application Ser. No. 06/542,272 filed Oct. 17, 1983 abandoned.

BACKGROUND OF THE INVENTION

1. Field of the Invention

This invention relates to a high temperature inorganic binder. More particularly, this invention relates to an inorganic chemical binder which may be used in conjunction with refractory fibers at very high temperatures. In still greater particularity, the invention is an inorganic binder including a tackifying agent. By way of further characterization, but not by way of limitation thereto, the invention is a chromium aluminum phosphate binder including bentonite clay.

2. Description of the Prior Art

Prior art binders for bonding refractory fibers have included a variety of compounds including colloidal silica and phosphoric acid (actually $P_2O_5$ which may be derived from $H_3PO_4$ under appropriate temperature conditions). While these binder systems are useful in certain applications, they are not without relative disadvantages. For example, prior art phosphoric acid binders do not adhere well to refractory fibers. Binders including colloidal silica are subject to irreversible precipitation of the silica if the binder has been subjected to freezing temperatures.

A very serious disadvantage with prior art binder systems is binder migration. That is, as the binders are cured, the binder migrates to the surface of the material producing a material with a very soft interior. This causes serious integrity problems with the resulting material. The material is thus not suitable for use in applications requiring a monolithic structure. In addition, prior binder systems employing colloidal suspensions such as colloidal silica or alumina must be cured very carefully. That is, because of binder migration, the colloidal sol must be allowed to gel prior to curing. Failure to do so results in migration of the binder particles from the interior to the surface of the insulation layer. In addition, prior art binders must be sprayed onto a cool surface thus necessitating relatively long cooling periods before a furnace can be insulated.

Another disadvantage of prior art binders has been that they are not nearly as temperature resistant as the refractory fibers themselves. Thus, high temperature applications of the fiber-binder mix are limited by the properties of the binder rather than the fiber. For example, an insulation product made from refractory fibers which are themselves temperature resistant up to 2600° F. may only be applied in temperature environments up to 2000° F. if the binder used in that product is only effective up to 2000° F. Any reaction of the binder and fiber which tends to flux the fiber composition causes increased fiber shrinkage. Thus, the use temperature of the fiber-binder system is limited to a temperature less than the use temperature of the fibers alone.

Other practical problems encountered with the use of prior binder systems is that they are expensive, there may be safety and environmental problems in their applications, they may lack good suspension properties, and finally, as with prior phosphoric acid binders, the binders do not possess the tackiness or adhesiveness properties which are desirable in many applications. In applications where it is desirable to spray the refractory fiber onto a surface such as a furnace wall, it is essential that the binder be sufficiently tacky to cause the fibers to adhere to one another and to the surface.

SUMMARY OF THE INVENTION

The present invention combines an inorganic binder matrix with temperature resistant clays. The tacky nature of the binder renders it suitable for a wide variety of applications. The resulting binder of the present invention is temperature resistant to at least 3000° F. which allows its use with high temperature refractory fibers. As used herein, refractory fibers are defined as inorganic amorphous or crystalline fibers which are not adversely affected by temperatures in excess of 1500° F. An example of such fibers is alumina-silica fibers. However, as is known in the art, fibers including zirconia, chromium, calcium, magnesium and the like may be utilized. The binder disclosed herein could also be employed with metal oxides to provide an insulating layer of such material. In addition, the binder system of the present invention greatly reduces or eliminates binder migration which occurs in prior art binders.

The binder includes a tackifying agent in combination with a phosphate binder matrix such as aluminum phosphate. The preferred tackifying agents are temperature resistant clays such as montmorillonite clays. The most preferred clay is western bentonite clay. A fluxing agent may also be added to the binder in small quantities to increase the strength of the binder to fiber bonds at elevated temperatures. Chromium oxide may also be added to the binder to improve the stability of the binder to fiber bonds at elevated temperatures. In addition, chromium oxide adds color to the binder which may be advantageous in the coating process.

In addition to phosphate compounds, colloidal suspensions such as colloidal silica, colloidal alumina, and colloidal zirconia may be combined with the tackifying agents disclosed herein to produce a suitable binder. When the disclosed tackifying agents are combined with these colloidal suspensions the severe binder migration problems associated with colloidal binders such as colloidal silica are overcome. The addition of the tackifying agent imparts good suspension characteristics to the binder. Additionally, the preferred binder of the present invention may be sprayed directly onto hot surfaces thus eliminating long delays in insulating furnaces requiring complete cool down. Finally, the novel binder claimed herein reduces shrinkage of the coated fibers thus improving their refractory characteristics. Because shrinkage is minimized, failure of the insulation layer due to cracks in the layer is reduced. Prior art binders, especially colloidal silica binders without the tackifying agent disclosed herein required gelling of the colloidal silica. Otherwise, serious binder migration to the surface of the insulation layer would occur.

DESCRIPTION OF THE PREFERRED EMBODIMENT

In accordance with the present invention, an excellent binder system has been discovered which preferably comprises chromium aluminum phosphate and a suitable tackifying agent. The chromium aluminum phosphate compound preferred in the present invention may be characterized by the following generalized formula: $Al_2O_3 \cdot 3P_2O_5 \cdot xCr_2O_3$ wherein x ranges from about 0.1 to 10.

The term "tackifying agent", as used with respect to the present invention, is meant to define those substances which impart tackiness or adhesive properties to the binder system of the present invention. Generally, such tackifying agents will be inorganic in nature. High temperature resistant clays, especially montmorillonite clays (preferably the western bentonite variety) have been found to be useful in the present invention. Sodium and calcium based clays such as southern bentonite may also be used as a tackifying agent. Whatever tackifying agent is used should, of course, be compatible with the overall binder system and its intended use with regard to both chemical and physical properties. It is especially important that the tackifier, in the quantity used, not produce fluxing of the binder-fiber system at elevated temperatures.

While the inventive binder system may be made according to any suitable method known to those skilled in the art, the superior binder system of the present invention is preferably made according to the generalized process described herein below.

A mixture of phosphoric acid solution, an appropriate fluxing agent such as boric acid, and bentonite clay are stirred together and then heated to a temperature (typically 100° F.) sufficient for the ingredients to react with one another. Although varying concentrations of phosphoric acid may be used, in the present invention a 75% or higher phosphoric acid solution is preferred. As used herein, the term appropriate fluxing agent is meant to include those substances which will impart added strength to the inventive binder system by improving glassy bonding at elevated temperatures. While boric acid is a preferred fluxing agent, other inorganic metal salts such as sodium carbonate, magnesium chloride, magnesium nitrate, calcium carbonate, cobalt oxide, and others may be employed.

After heating to approximately 100° F. the above reaction mixture is combined with a hydrated alumina. The preferred alumina is a hydrated alumina such as that currently marketed by ALCOA under the trademark C-31. The mixture is then heated to a temperature of approximately 180° F. at which time chromic oxide ($Cr_2O_3$) is added. The preferred chromic oxide has a specific gravity of 5.1 and is added in a percent, by weight, of 1.26% of the total mixture weight. At this point the reaction becomes exothermic, the temperature rises to approximately 238° F., the volume of the mixture approximately doubles, and the reaction is complete. The solution is allowed to cool and an inert carrier such as water is added to adjust the specific gravity of the binder to 1.70 at room temperature.

The above ingredients are used in the present invention at the following general, preferred, and most preferred weight percentage levels based upon the total weight of the binder.

TABLE

| Ingredient | General | Preferred | Most Preferred |
| --- | --- | --- | --- |
| Phosphoric Acid Solution | 60–90 | 75–85 | 78.8 |
| Fluxing Agent | 0–5 | 2–4 | 2.87 |
| Tackifying Agent | 1–8 | 1–5 | 2.87 |
| Hydrated Alumina | 5–30 | 10–20 | 14.2 |
| Chromium Compound | 0.5–5 | 1–2 | 1.26 |

While chromic oxide $Cr_2O_3$ has been disclosed, other suitable chromium compounds include solutions of chromic acid ($H_2CrO_4$), and chromium salt solutions such as magnesium chromate, which can be converted under appropriate temperature conditions to chromia ($Cr_2O_3$), may be added.

Similarly, while alumina has been disclosed as the preferred metal oxide to be reacted with the phosphoric acid solution, magnesium oxide or other suitable metal oxides may be reacted with the phosphoric acid solution without departing from the scope of the invention.

An alternate binder formulation includes colloidal silica combined with a tackifying agent. Preferably NALCO 1115 Colloidal Silica of the 4 millimicron size Sol containing 15% solids is used. Approximately forty pounds (40 lbs) of this colloidal silica was mixed with 1.25 pounds of western bentonite to form a tacky binder.

The addition of a montmorillonite clay such as western bentonite to the binder matrix has been found to produce a tacky binder which adheres to virtually any surface. While Western Bentonite is preferred, any of the clays selected from the Montmorillonite types of clay minerals have been found to be suitable tackifying agents.

The binder of the present invention may be advantageously employed with refractory fibers in a spray-on process. That is, refractory fibers may be directed from a spray gun while at the same time being coated with the binder of the present invention. Such application of refractory fiber and binder has been found to raise the operating temperature of the refractory fibers above their normal rated temperature. For application of refractory fiber to a surface such as a furnace wall, the binder is diluted, preferably with water, in a 4.5 to 1 water to binder ratio by volume. This ratio may range from 2 to 1 to 15 to 1 by volume. The diluted binder is preferably stirred in the dilution container to ensure a homogenous mixture during the spraying process. The diluted binder may be sprayed with the fiber onto a surface in a ratio which depends upon binder dilution. For the preferred chromium aluminum phosphate binder disclosed above, a ratio of 1.75 lbs. of fiber to 1.0 lb. binder is preferred.

Examples of different binder formulations and concentrations are listed below:

Binder #1 was a mixture of NALCO AG 1115 colloidal silica marketed by NALCO Chemical Corp. of 4 millimicron size particles containing 15% solids. Forty pounds of this solution was mixed with 1.25 lbs. of western bentonite. The resulting binder was sprayed in a 30% binder 70% alumina-silica-zirconia fiber ratio by weight and cured at 1000° F. A 12 lb/ft$^3$ composite material resulted having good integrity.

Binder #2 was a mixture of the chromium aluminum phosphate binder matrix with bentonite clay and boric acid in the most preferred formulation previously disclosed. This binder concentrate was diluted 4 to 1 by volume with water and sprayed with alumina-silica-zirconia fiber in a ratio of 14% binder to 86% fiber by weight. This composite was then cured at 1000° F. and produced a 12 lb/ft$^3$ material.

Binder #3 was a mixture of ¼ lb. colloidal alumina, 2 lbs. of —325 mesh $Al_2O_3$ particles and 1¼ lbs. bentonite in 40 lbs. of water. This binder concentrate was sprayed with alumina-silica-zirconia fibers in a ratio of 40% binder to 60% fiber. The resulting material was cured at 1000° F. and produced a material which did not adhere well to the brick substrate and did not produce material or sufficient integrity to allow density to be accurately measured.

Binder #4 was a mixture of 11 lbs. of Kaolin Clay, ¾ lbs. western bentonite and 30 lbs. of water. This binder mixture was too viscous to be sprayed.

Binder #5 was a mixture of the chromium aluminum phosphate binder matrix with bentonite clay and boric acid in the most preferred formulation previously disclosed. This binder concentrate was diluted 10 to 1 by volume with water and sprayed in equal amounts by weight with alumina-silica-zirconia fiber. The resulting material was cured at 1000° F. and produced a material of 15 lb/ft$^3$ density.

Binder #6 was a mixture of the chromium aluminum phosphate binder matrix with the bentonite clay and boric acid in the most preferred forumulation previously disclosed. This binder concentrate was diluted 15 to 1 by volume with water and sprayed in a ratio of 45% binder to 55% alumina-silica-zirconia fiber by weight. The resulting material was cured at room temperature and produced a material of 13 lbs/ft$^3$ density.

Binder #7 was a mixture of the chromium aluminum phosphate binder matrix with bentonite clay and boric acid in the most preferred formulation previously disclosed. This binder was diluted 15 to 1 by volume with water and sprayed in a ratio of 36% binder to 64% alumina-silica-zirconia fiber by weight. The resulting material was cured at 1000° F. but did not produce a material of sufficient integrity to obtain a density measurement.

Binder #8 was the colloidal silica binder disclosed as binder #1 without the bentonite clay. The binder was sprayed in a 60% binder to 40% fiber ratio by weight with alumina-silica-zirconia fibers. The resulting material was cured at 1000° F. but did not produce a material of sufficient integrity to obtain a density measurement due to binder migration.

Binder #9 was a mixture of bentonite clay and water in a ratio by weight of 10% bentonite to 90% water. This binder did not bond with the alumina-silica-zirconia fiber.

A comparison of characteristics of the binder formulations is given below:

|  | Binder Tacky | Integrity with Fibers after Curing | Binder Migration |
| --- | --- | --- | --- |
| Binder #1 | Yes | Good | Some |
| Binder #2 | Yes | Fair | Very little |
| Binder #3 | Yes | Fair | Some |
| Binder #4 | Yes | Unknown | Unknown |
| Binder #5 | Yes | Excellent | Very little |
| Binder #6 | Yes | Excellent | Very little |
| Binder #7 | Yes | Fair | Unknown |
| Binder #8 | No | Poor | Very heavy |
| Binder #9 | Yes | None | Unknown |

A comparison of shrinkage between the materials of binders #1, 2, 3, 5, and 6 was made with each other and with the fiber alone. After being exposed to a temperature of 2400° F. for four hours the binder-fiber composites exhibited the following shrinkage characteristics:

|  | Shrinkage (%) |
| --- | --- |
| Binder #1 | 2.6 |
| Binder #2 | 1.5 |
| Binder #3 | 1.6 |
| Binder #5 | 1.6 |
| Binder #6 | 1.4 |
| Fiber alone | 2.0 |

From the above it can be seen that composites formed from the most preferred binder concentrate formulation of binder #2, 5 and 6 exhibited less shrinkage than the fiber alone. While binder #3 exhibited low shrinkage, the specific binder formulation exhibited only fair bonding characteristics.

A comparison of curing temperatures was made for binder #5. That is, the material made under binder formulation #5 was cured at 250° F., 350° F. and 450° F. Each material was then placed in a 90% humidity chamber for 72 hours with the following results: the material cured at 250° F. received 31% added moisture and was wet and soft suggesting incomplete curing; the material cured at 350° F. received 18% added moisture and was somewhat wet and soft, but was marginally acceptable; and the material cured at 450° F. received 13% added moisture and was hard and held its integrity. Thus the curing temperature has a lower limit of about 350° F. with a preferred curing temperature of about 450° F. or more.

In order to determine the preferred limits of dilution and binder to fiber ratio for the most preferred chromium aluminum phosphate binder, the formulations of binders #2, 5, 6 and 7 were tested. The fiber-binder composite materials were compared with respect to the weight ratio of the original binder concentrate to fiber weight ratios in light of the integrity observed in the resulting material. The ratio of the weight of binder concentrate to fiber was 4.86% for binder #2; 14.52% for binder #5; 8.33% for binder #6; and 5.72% for binder #7. The materials produced by binders #5 and 6 had excellent integrity while the material from binders #2 and 7 had fair integrity. This suggests that the preferred binder concentrate to fiber weight ratio should be at least 6%. Thus, the binder dilution and diluted binder to fiber weight ratio should be adjusted accordingly.

What is claimed is:

1. An inorganic liquid refractory binder for use in a spray applied refractory fiber process at temperatures in excess of 1500° F., said binder comprising by weight percent:
   phosphoric acid solution: 60–90%
   hydrated alumina: 5–30%
   tackifying agent: 1–8%.

2. A refractory binder according to claim 1 further including 0.5 to 5% by weight percent of a chromium compound.

3. Binder according to claim 2 wherein said chromium compound is chromic oxide.

4. Binder according to claim 1 further including up to 5% by weight of a fluxing agent.

5. Binder according to claim 4 wherein said fluxing agent is boric acid.

6. Binder according to claim 1 wherein said tackifying agent is montmorillonite clay.

7. Binder according to claim 1 wherein said tackifying agent is bentonite clay.

8. A refractory material comprising:
   a plurality of refractory fibers; and
   a liquid inorganic binder including a phosphate-tackifying agent mixture.

9. Material according to claim 8 wherein said tackifying agent includes montmorillonite clay.

10. Material according to claim 8 wherein said mixture further includes a chromium compound.

11. Material according to claim 8 wherein said mixture further includes a fluxing agent.

12. Material according to claim 11 wherein said fluxing agent is boric acid.

13. Material according to claim 8 wherein said mixture further includes alumina.

14. A refractory material comprising:
    a plurality of refractory fibers; and
    a liquid inorganic binder including:
       a chromium alumina phosphate solution; montmorillonite clay in intimate admixture with said solution; and
       a fluxing agent in intimate admixture with said solution.

15. Material according to claim 14 wherein said fluxing agent includes boric acid.

* * * * *